United States Patent [19]

Dale et al.

[11] Patent Number: 5,103,595

[45] Date of Patent: Apr. 14, 1992

[54] APPARATUS AND METHOD FOR REDUCING VIBRATION CHARACTERISTICS IN A WHEEL RIM AND TIRE ASSEMBLY

[75] Inventors: James L. Dale; Steve Rogers, both of Conway, Ark.

[73] Assignee: FMC Corporation, Chicago, Ill.

[21] Appl. No.: 522,768

[22] Filed: May 14, 1990

[51] Int. Cl.⁵ .................................. B24B 49/00
[52] U.S. Cl. ........................... 51/165.71; 51/165.74; 51/289 R; 73/460
[58] Field of Search .......... 51/165.71, 281 R, 165.74, 51/169, 289 R, 326; 73/459, 460, 462, 146; 157/13

[56] References Cited

U.S. PATENT DOCUMENTS

| | | |
|---|---|---|
| 3,553,903 | 1/1971 | Christie . |
| 3,681,877 | 8/1972 | Shively et al. ............... 51/106 R |
| 3,752,207 | 8/1973 | Branham et al. ............... 157/13 |
| 3,780,573 | 12/1973 | Reus ........................... 73/146 |
| 3,905,160 | 9/1975 | McKenney ..................... 51/281 |
| 3,948,004 | 4/1976 | Gruber ....................... 51/165 R |
| 4,078,339 | 3/1978 | Ongaro ........................ 51/281 |
| 4,160,378 | 7/1989 | Himmler ...................... 73/146 |
| 4,223,386 | 9/1980 | Maruyama et al. ............... 364/506 |
| 4,244,416 | 1/1981 | Newton ....................... 157/13 |
| 4,302,966 | 12/1981 | Ohnishi et al. ................ 73/66 |
| 4,366,707 | 1/1983 | Jarschel ...................... 73/146 |
| 4,655,080 | 4/1987 | Ongaro ........................ 73/462 |
| 4,805,125 | 2/1989 | Beebe ......................... 364/570 |
| 4,817,429 | 4/1989 | Goebel ........................ 73/459 |

OTHER PUBLICATIONS

Dynabal 4700 brochure.

*Primary Examiner*—M. Rachuba
*Attorney, Agent, or Firm*—H. M. Stanley; R. C. Kamp; R. B. Megley

[57] ABSTRACT

A combination tire and rim assembly match mounting, match grinding and balancing machine has a load roller for contacting the mounted tire periphery with a predetermined force. The displacement of the roller provides a measure of tire radial runout and either a vision system or mechanical probes provide a measure of rim radial runout. A controller operates to calculate the least square best fit between the tire and the rim and to control the match grinding to provide improvement in the tire and rim assembly operating vibration characteristics.

40 Claims, 8 Drawing Sheets

FIG_1

FIG_2

FIG_3

FIG_9

FIG_5

FIG_6

FIG_7

FIG_8

APPARATUS AND METHOD FOR REDUCING VIBRATION CHARACTERISTICS IN A WHEEL RIM AND TIRE ASSEMBLY

SUMMARY OF THE INVENTION

Apparatus is disclosed herein for diagnosing and correcting vibration causing characteristics in a wheel rim and tire assembly, which includes means for measuring unbalance in the wheel rim and tire assembly and for indicating angular position and magnitude of mass change necessary to correct the unbalance. Means is included for measuring the radial runout of the wheel rim as well as means for measuring radial runout of the tire mounted on the wheel rim. Means is provided for calculating the least squares, best fit between the measured tire and wheel rim radial runouts and for indicating the relative angular position of the wheel rim at which the least squares best fit occurs.

In another aspect of the invention apparatus is disclosed for diagnosing and adjusting a tire and wheel rim for optimal relative mounting position wherein means is included for supporting the wheel rim for driven rotation thereon together with means for detecting the position, configuration and radial runout of the wheel rim and the tire mounted thereon. Means is provided for loading the periphery of the mounted tire with constant force together with means for sensing the displacement of the means for loading. Means for comparing is coupled to the means for detecting and the means for sensing wherein the radial runout of the wheel rim is compared with the radial runout of the tire mounted in an initial position on the wheel rim and a least squares best fit is calculated between the tire and the wheel rim radial runouts which represents an optimal position of the tire A method of diagnosing and adjusting a rim and tire assembled in a first positional relationship is disclosed so that the assembled rim and tire is brought within acceptable operating limits. The method includes the step of measuring the loaded radial profile of the rim and tire in the first positional relationship for the entire peripheral profile and the step of detecting the unloaded tire profile for the entire profile. Inspecting the detected sidewall profile for proper bead seating and for surface defects is included together with measuring the unloaded runout of the rim and tire in the first positional relationship. Further the step of computing the runout of the tire from the unloaded runout measurement of the rim and tire in the first positional relationship is included, along with the step of measuring the loaded radial runout of the rim and tire in the first positional relationship. The method also includes the step of matching the rim and tire in a second positional relationship, match grinding the tire, and applying mass to correct rim and tire unbalance as indicated by the results of the foregoing steps to bring the rim and tire within acceptable operating limits.

In another aspect of the invention the method is disclosed for diagnosing and adjusting a rim and tire assembled in a first positional relationship so that the assembled rim and tire is brought within acceptable operating limits, wherein the step of detecting the unloaded sidewall profile for the entire profile is included together with the step of inspecting the detected sidewall profile for proper bead seating and for surface defects. Additionally, the method includes measuring the unloaded runout of the rim and tire in the first positional relationship together with computing the runout of the tire from the unloaded runout measurement of the rim and tire in the first positional relationship. Further, performing a tread wear analysis from the unloaded runout measurement is included together with matching the rim and tire in a second positional relationship, match grinding the tire, and applying mass to correct rim and tire unbalance as required by the foregoing dimensional mapping steps to bring the rim and tire within the acceptable limits.

A method is provided for adjusting a rim and tire assembled in a first positional relationship so that the assembled rim and tire is within acceptable radial runout and unbalance limits comprising the steps of measuring the radial runout of the rim and tire in the first positional relationship for at least one revolution, comparing the measured radial runout with the acceptable runout limits, measuring the rim radial runout for at least one revolution when the measured radial runout limit is exceeded in the first positional relationship, calculating a least squares best fit second rim and tire positional relationship using the rim and tire and the rim radial runout measurements, and adjusting the tire on the rim rotationally to the second positional relationship when sufficient radial runout improvement is predicted.

A method is disclosed for reducing operating vibration characteristics so they are within specifications for a wheel rim and tire assembly with the tire mounted in an initial position wherein the loaded runout of the assembly is measured while a constant force is exerted against the tire periphery. The runout of the wheel rim is also measured and a determination is made as to whether either rim or tire runout is excessive. If not excessive, the runout of the tire and the rim are compared to determine if match mounting the tire to a subsequent position on the rim would provide vibration improvement. The tire is moved on the rim to the subsequent position if improvement is indicated. A check is made to determine if match grinding would be beneficial if the assembly with the tire at the subsequent position is not within vibration specification and if improvement from grinding is would occur. The tire is subjected to match grinding if the assembly is out of specification and improvement would result. The wheel assembly unbalance is then measured and, if not within unbalance specifications, the unbalance is corrected.

DESCRIPTION OF THE PREFERRED EMBODIMENT

Vehicle wheel rims and tires all have varying amounts of irregularity or runout. Runout is generally divided into lateral runout, or variation of the plane of the wheel rim and tire assembly from orthogonality with the wheel rim spin axis, and radial runout, or variation in the radius of the wheel rim or tire around their peripheries. In approaching the problem of reducing operational vibrational characteristics in a wheel rim and tire assembly, it is important to be able to measure the magnitude of these irregularities as well as the variation of the spring rate in the sidewall of a tire mounted on a wheel rim and the mass unbalance of a wheel rim and/or rim/tire assembly with respect to the rotational axis of the wheel rim. The manner in which wheel balancers operate and in which wheel balancers are calibrated for accurate measurement of the unbalance mass in a wheel rim and tire assembly are described in U.S. Pat. Nos. 4,285,240 Reissue 31,971, Gold; 4,338,818, Hill; 4,450,529, Hill; and 4,494,400, Hill, all assigned to the assignee in this application. The manner in which lateral runout in a wheel rim is measured and the apparatus for performing such measurements are described in U.S. Pat. Nos. 4,138,825, Pelta; 4,192,074, Chang; and 4,180,915, Lill, also assigned to the assignee of this application. The inventive apparatus and method disclosed herein will generally, although not necessarily, be used in conjunction with the wheel balancing apparatus and methods disclosed in the foregoing patents.

The measurement of the irregularities in a tire and wheel rim for improving vehicle operating characteristics is important from the standpoint of detecting when a tire or wheel rim should be replaced, or when the irregularity in one of the tire or wheel rim may be used to offset an irregularity in the other. Radial runout in a tire measured unloaded on a rim may be used to offset, at least in part, measured radial runout in a wheel rim. Such a process, however, does not take into account possible variation of spring rate in a tire sidewall as it exists around the periphery of the tire. Some approaches are known wherein the variation of force at the periphery of a rotating tire is measured as seen in U.S. Pat. No. 4,223,386, Maruyama et al, issued Sept. 16, 1980. Procedures for assembling the mass unbalance of a wheel rim in opposition to the mass unbalance of a tire mounted thereon are shown in U.S. Pat. Nos. 4,302,966, Onishi et al, issued Dec. 1, 1981 and 4,817,429, Goebel, issued Apr. 4, 1989 wherein the procedures relate to compensation to some extent of rim mass unbalance with tire mass unbalance.

Figure 1:
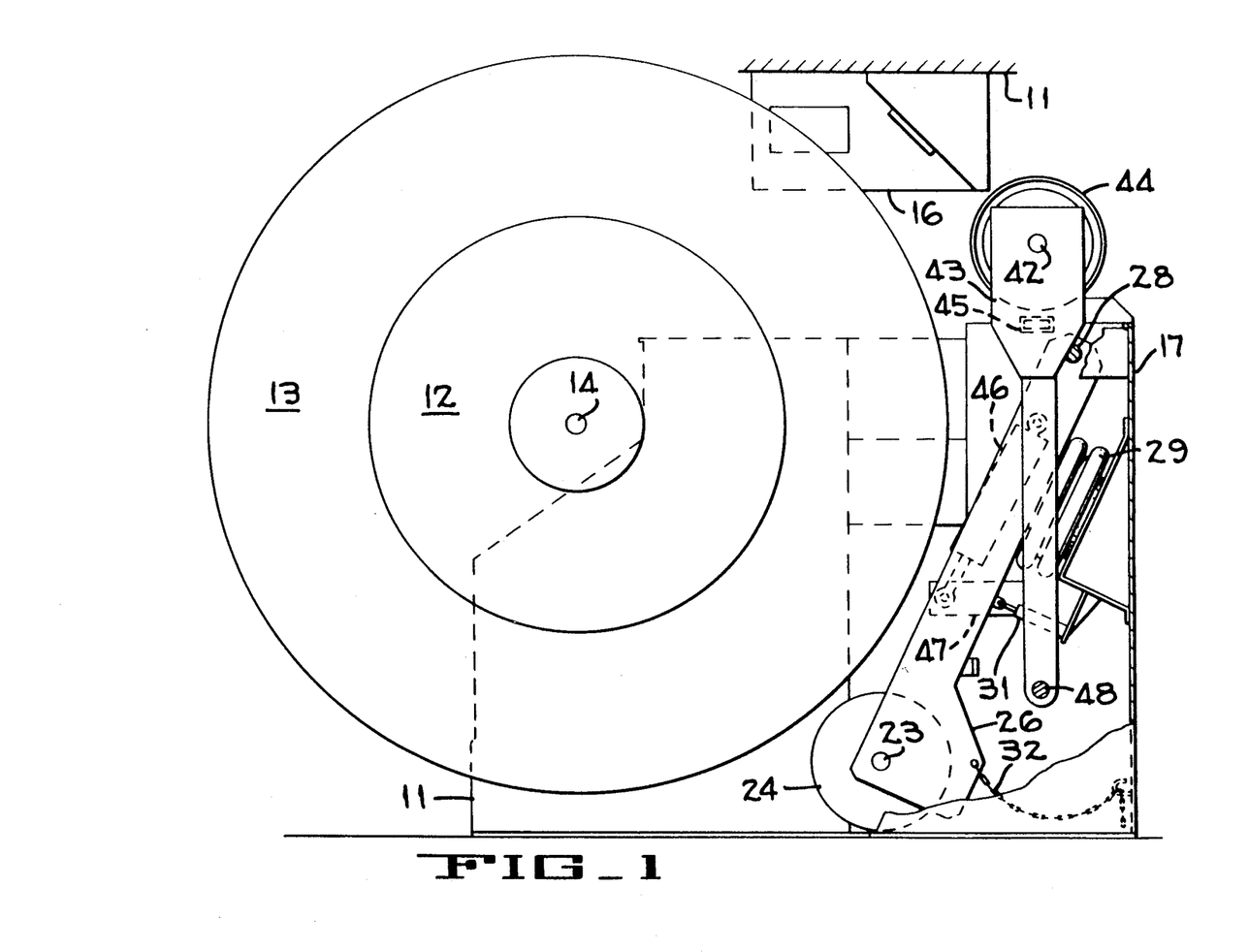
FIG. 1 is an elevation view of the apparatus of the present invention.

The foregoing teachings each describe incomplete apparatus and method for analyzing and correcting all possible sources of ride disturbance or operational vibrational characteristics in a vehicle wheel rim and tire assembly. The apparatus of FIG. 1 shows a wheel balancer 11 mentioned hereinbefore as having a wheel rim 12 and a tire 13 mounted thereon. The wheel rim is mounted on a shaft 14 extending from the wheel balancer 11, wherein the shaft is driven rotationally by a motor (not shown) mounted within the wheel balancer. Included as part of the wheel balancer is a display such as a CRT or a printer as well as a vision system 16 attached thereto. The vision system may be such as described in U.S. patent application Ser. No. 07/473,754 filed Feb. 2, 1990, Downing et al. The vision system is present for the purpose of measuring wheel rim 12 and tire 13 characteristics including rim diameter and width, rim and tire radial and axial runout, sidewall condition and tire tread condition. Alternatively, other apparatus may be included in the wheel balancer 11 to measure wheel rim and tire characteristics as disclosed, for example, in U.S. Pat. No. 4,285,240 and Reissue 31,971 thereof mentioned hereinbefore.

Figure 2:
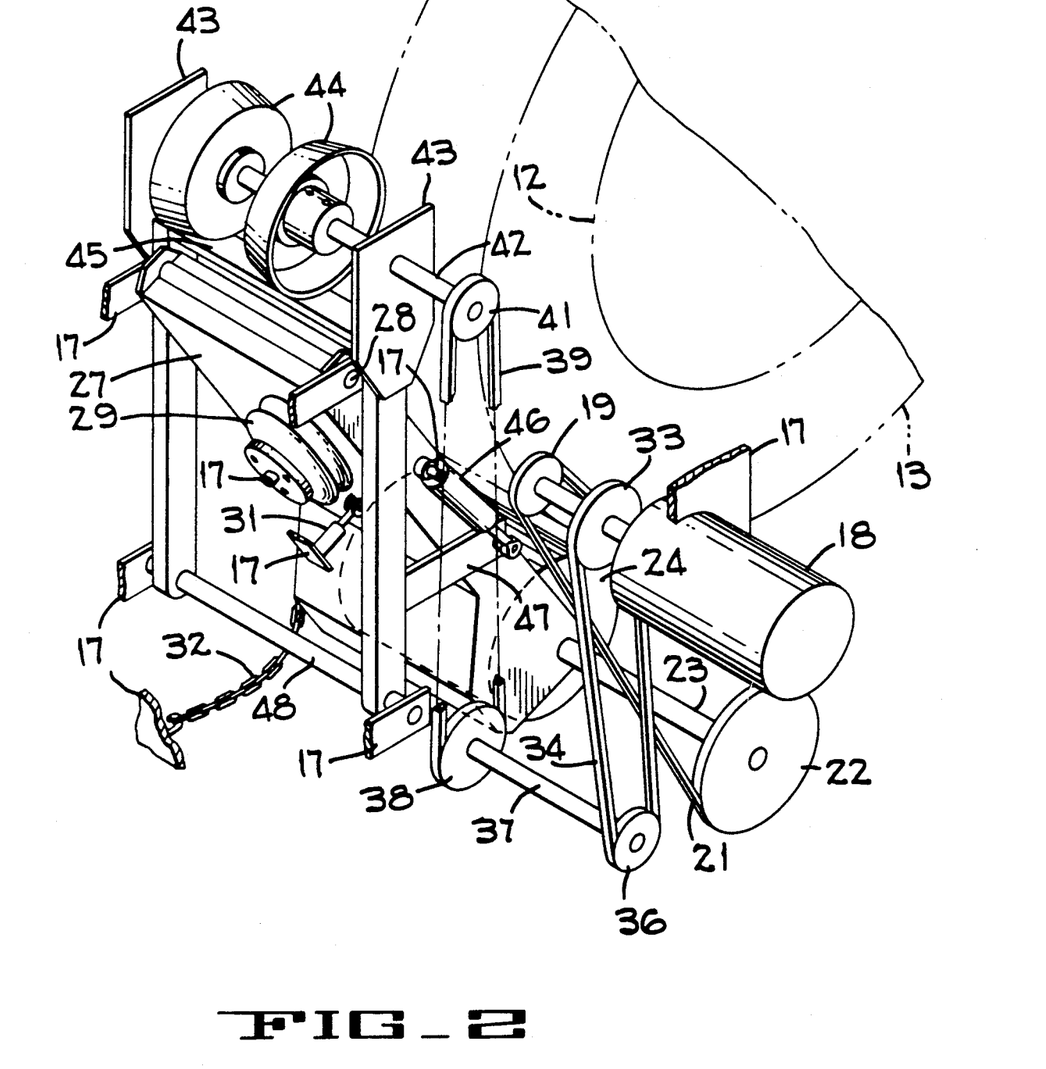
FIG. 2 is a perspective view of the apparatus of the present invention.

An auxiliary support structure 17 is shown attached to the wheel balancer 11 which has two pivoting assemblies mounted thereon driven by a motor 18 also mounted on the auxiliary support structure as best seen in FIG. 2. The shaft extending from motor 18 drives a pulley 19 having a belt 21 extending therearound. The belt 21 also engages a pulley 22 which is fastened to and drives a shaft 23 coupled to a loading drum or load roller 24. The load roller 24 is supported on a pair of arms 26 having a flat plate 27 extending therebetween. The arms 26 are pivoted from the auxiliary support structure 17 on a pivot shaft 28. An air spring 29, which may be seen in both FIGS. 1 and 2, extends between the plate 27 and the auxiliary support structure 17. A displacement transducer 31, which may be a potentiometer or a linear variable differential transformer or some other suitable or similar device, is disposed between the plate 27 and the auxiliary support structure 17 for the purpose of measuring the displacement of the load roller or drum 24 when it is forced against the periphery of the tire 13 by a constant force exerted by the air spring 29 as will be hereinafter described. A chain 32 or some other suitable device extending between the auxiliary support structure and one of the arms 26 is utilized to limit the travel of the arms 26 about the pivot shaft 28 in a clockwise direction as viewed in FIG. 1.

FIG. 2 shows another pulley 33 attached to the shaft extending from motor 18. A belt 34 extends around the pulley 33 and also around a pulley 36 which is attached to a shaft 37. At the opposite end of shaft 37 is mounted another pulley 38 about which runs a belt 39. The belt 39 extends to and drives another pulley 41 which is attached to a shaft 42. Shaft 42 is supported for rotational movement between two parallel arms 43. Two spaced truncated conical abrasive "wheels" 44 are fixed to the shaft 42, being driven rotationally by motor 18 through the aforedescribed series of pulleys, belts and shafts. The "wheels" 44 are used to grind tire material from the edges of the tire tread on the tire 13 when they are being rotated and the arms 43 are urged toward the tire by a pneumatic piston and cylinder assembly 46. The pneumatic piston and cylinder assembly extends between an arm 47 extending from one of the parallel grinder arms 43 and the auxiliary support structure 17 as seen in FIG. 2 in full lines and in FIG. 1 in dashed lines. The parallel grinder support arms 43 having the rotating grinder shaft 42 extending therebetween at the upper end, are pivoted at the lower end on a shaft 48 supported on the support structure 17. It may be seen that when the piston rod is caused to extend from the pneumatic assembly 46 the grinder "wheels" will be caused to rotate in a counterclockwise direction about the shaft 48 as seen in FIG. 1 toward the periphery of a tire 13 mounted on the balancer 11. In this fashion the grinder "wheels" 44 may be caused to come into contact with the edges of the tread of the tire 13 by extension of the piston rod from the pneumatic assembly 46. The grinder "wheels" are adjustable and then fixed in spaced relationship in accordance with the tread width of the tire mounted on the wheel balancer shaft 14. It is thought that grinding the edges of the tread on the tire to remove tire material therefrom operates to alter the mass distribution in the tire as well as to adjust the spring rates of the tire sidewall in the region of the tire where grinding is accomplished.

It should be noted that the pivot shaft 28 is substantially colinear with the driving shaft extending from motor 18. It should also be noted that the idler shaft 37 is substantially colinear with the pivot shaft 48 for the grinding "wheels". This mechanical arrangement allows both the roller 24 and the grinding wheels 44 to be rotated about their respective pivot shafts 28 and 48 without "binding" occurring in the pulley and drive belt arrangements for rotating the load roller and the grinding wheels.

Figure 3:
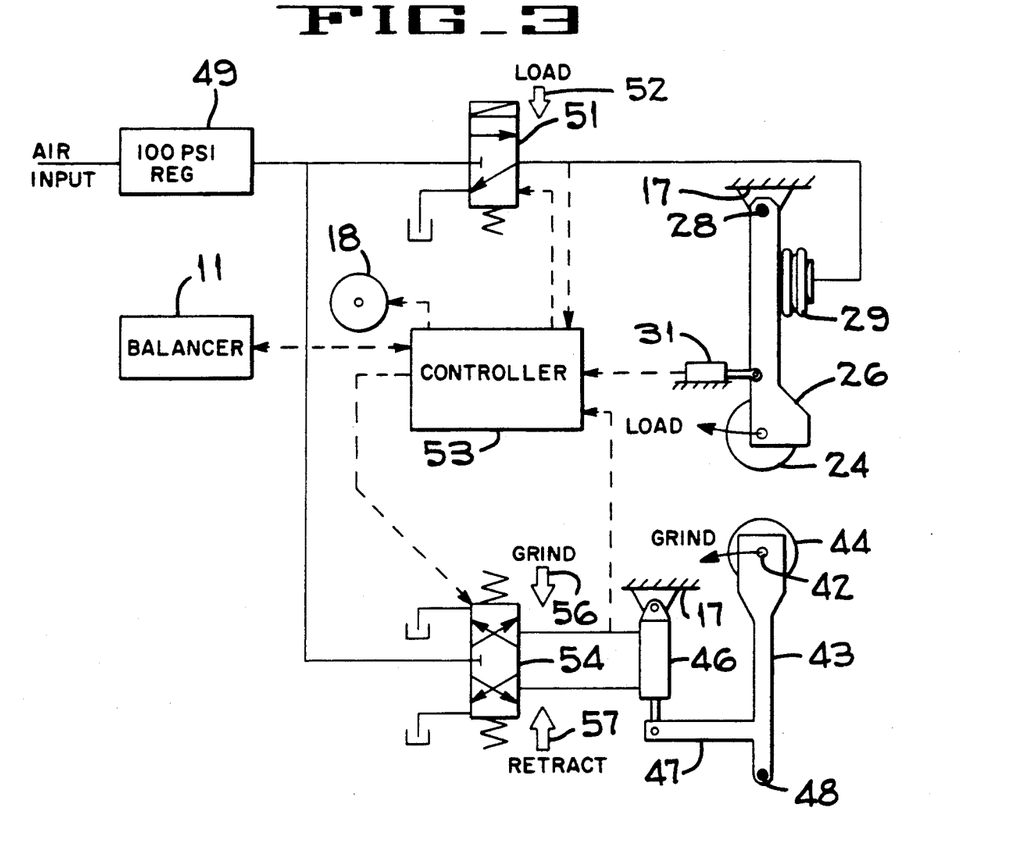
FIG. 3 is a block diagram showing the controller and controlled elements of the present invention.

Reference to FIG. 3 of the drawings shows that air pressure is introduced into pressure regulator 49, which in the disclosed embodiment is a 100 psi regulator. A controlled valve such as a solenoid operated valve 51 is actuated in the direction of the arrow 52 to introduce pressure to the air spring 29. The air spring is thereby caused to provide a force according to the regulator pressure. Alternatively, the pressure in the air spring is monitored by a controller 53 which senses the pressure in the air spring at the pressure input thereto as shown in FIG. 3 to thereby cause the arms 26 to rotate in a clockwise direction and apply a predetermined load against the periphery of the tire 13 by forcing the roller 24 thereagainst. The motion of roller 24 radially on the periphery of the tire 13 as the tire rotates is sensed by the displacement transducer 31. The displacement measurement is transmitted to the controller 53 as shown in FIG. 3.

As also shown in FIG. 3 the output from pressure regulator 49 is attached to a double acting solenoid valve 54 controlled by controller 53 so that actuation of the valve in the direction of arrow 56 will cause the rod in pneumatic assembly 46 to extend which in turn will cause grinding "wheels" 44 to rotate counterclockwise about pivot shaft 48 as seen in FIG. 3 to contact and grind material from the edges of the tread of a tire 13 mounted on the wheel balancer 11. The controller 53 is apprised of the time the grinding "wheels" 44 are urged into contact with the tire 13 by monitoring the pressure to pneumatic assembly 46 which extends the piston rod therefrom. The volume of tire material removed by the grinding "wheels" is calculated by the controller considering the time and pressure. The controller is also connected to the balancer 11 and to the encoder (not shown) in the balancer which indicates the angular position of the balance shaft 14. In this fashion the grinding wheels 44 may be brought into contact with the tire 13 at predetermined portions of the tire periphery as identified by the balancer encoder. The grinding "wheels" 44 are withdrawn from the periphery of the tire 13 by urging the solenoid valve 54 in the direction of arrow 57 which causes the rod extending from pneumatic assembly 46 to retract, thereby rotating the grinding wheel assembly about shaft 48 in a clockwise direction as seen in FIG. 3. It may also be seen that motor 18 is controlled by controller 53 so that the wheel rim and tire assembly may be rotated on the balancer 11 by rotation of the load roller 24. In this fashion, the wheel rim and tire assembly may be rotated for match mounting and wheel grinding operations by the load roller 24 and for mass unbalance measurement by the motor (not shown) contained in balancer 11.

Figure 4:
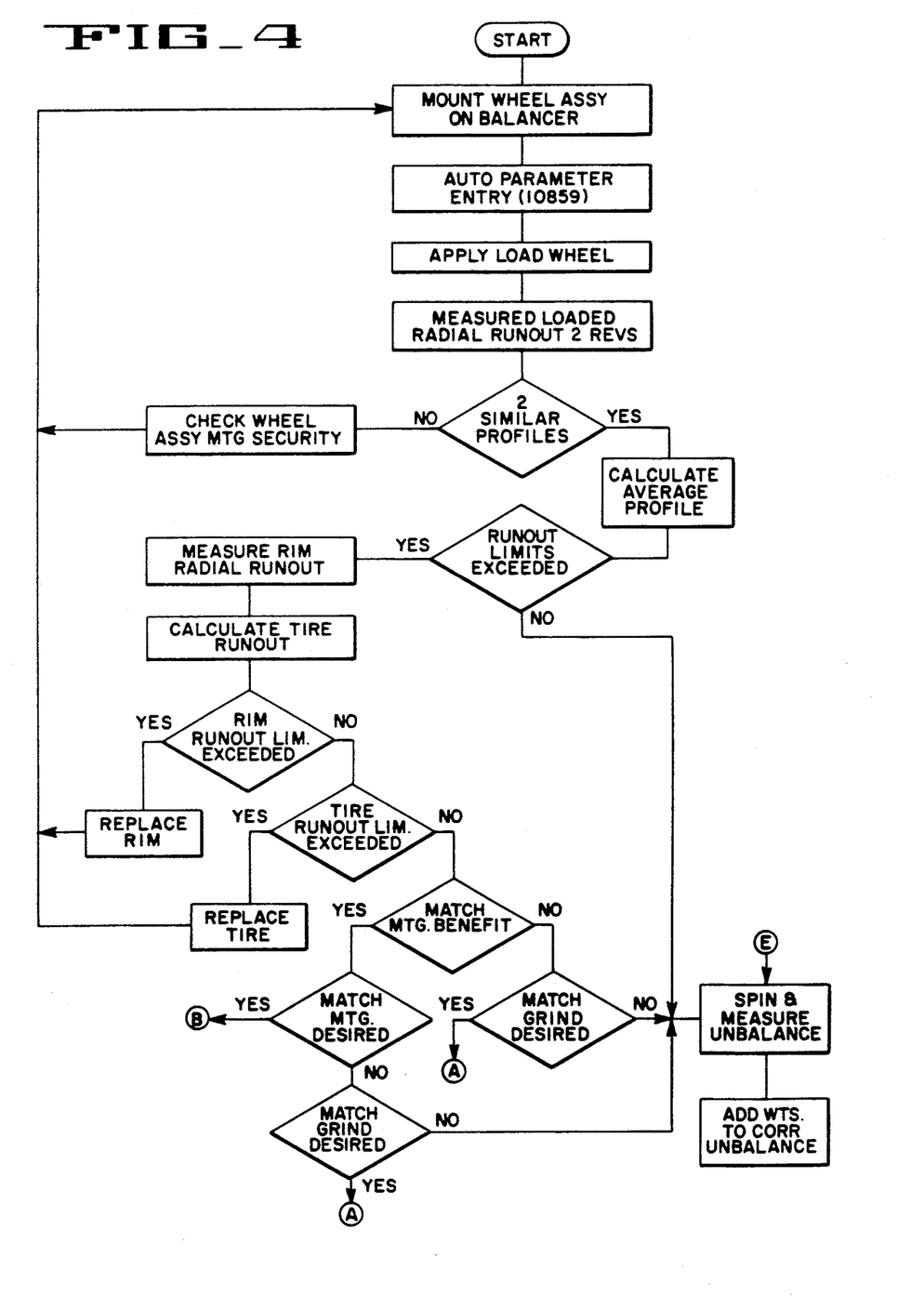
FIG. 4 is a flow chart showing a method performed by the disclosed apparatus.

With reference now to FIG. 4 the process by which a wheel rim and tire assembly is measured for vibration characteristics while mounted on the wheel balancer shaft 14 will be described. The wheel rim and tire assembly is mounted on the shaft 14 and the wheel assembly parameters such as rim diameter, rim width, rim runout (lateral and radial), tire side wall condition, wheel rim and tire assembly runout (lateral and radial) and the wheel tread condition are measured by the vision system 16 described in the patent application assigned to the assignee of this application as hereinbefore mentioned. These measurements may be made by alternative mechanical means known to those of skill in this art. Load wheel 24, driven by the pulley and belt arrangement described hereinbefore, is urged against the periphery of the tire 13 by the air spring 29 with some constant predetermined force controlled by the pressure regulator 49 or the controller 53 as described hereinbefore in conjunction with FIG. 3. The wheel rim and tire assembly is rotated for two revolutions in a loaded condition and the radial runout of the assembly at the periphery of the tire is measured by the transducer 31. The results of the radial runout measurements for the two revolutions are compared to see if the two rotational profiles are substantially similar. If the two profiles are not similar it is an indication that something in the measurement set up, such as having mounted the wheel assembly loosely on the shaft 14 so that it is subject to excessive radial motion on the shaft, has occurred. In such a case the wheel assembly mounting security on the shaft 14 should be examined and the routine of FIG. 4 reentered at the initial point. If the two radial runout profiles are similar within predetermined tolerances, then the average of the two profiles is calculated by the controller 53. Radial runout at the periphery of the tire will have a tolerance for an acceptable value to warrant continuing the process. For example, such a radial runout maximum may be 0.1 inches. If the selected runout limit is not exceeded, then the process should proceed to measurement of the mass unbalance in the wheel rim and tire assembly on the wheel balancer 11 and addition of compensating weight at the positions and in the amounts indicated by the wheel balancer to bring the wheel assembly within acceptable tolerances for operating vibration characteristics on a vehicle. If the calculated average runout profile exceeds the predetermined limits, then the rim radial runout is measured. Having measured the rim radial runout by means of the vision system 16 or one of the alternative mechanisms mentioned hereinbefore, the radial runout of the tire 13 may now be calculated. The tire radial runout is the difference through a full revolution between the rim and the rim and tire assembly runout. Radial runout limits are established for the rim. Such limits are exemplified by 0.04 inches for steel wheels or 0.03 inches for alloy or decorative wheels. If the measured rim runout limit is exceeded, the process requires replacement of the rim. If the rim runout limit is not exceeded the process next investigates whether the tire runout limit is exceeded. A typical tire runout maximum as established by some tire manufacturers is 0.06 inches. If the radial runout limit for the tire is exceeded, the process envisions replacement of the tire. If the tire runout limit is not exceeded, the process next considers whether any benefit is to be achieved by match mounting the tire on the rim. If no match mounting benefit is to be achieved, the process includes inquiry as to whether match grinding is desired. In the event no match grinding is desired, the process goes to spin and measurement for mass unbalance of the tire and rim assembly on the shaft 14 of the wheel balancer 11 together with addition of unbalance correction weights. If match grinding is desired, the process proceeds to A, FIG. 6, which will be described hereinafter. If match mounting benefit is capable of being achieved, and match mounting is desired by the operator of the system, the system is so informed and the process proceeds to B, FIG. 5 of the drawings, to be hereinafter described. If no match mounting is desired, the process thus proceeds to a query as to whether match grinding is desired. Unbalance measurement as described hereinbefore is undertaken in the event the answer is "no", or the process is advanced to A, FIG. 6 for match grinding, as stated hereinbefore, in the event the answer is "yes".

Figure 5:
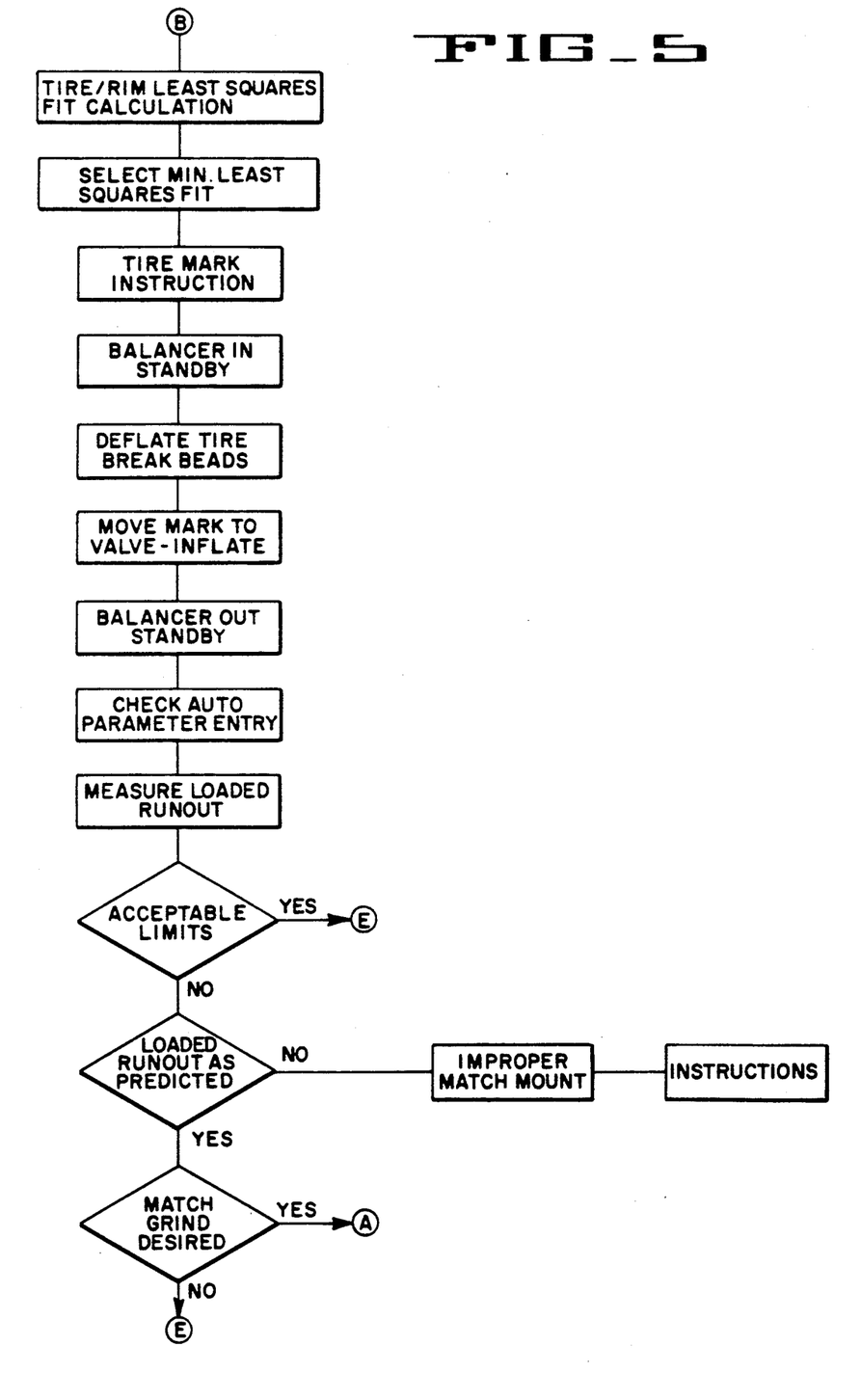
FIG. 5 is another flow chart showing a method performed by the apparatus of the present invention.

FIG. 5 shows the process involved where match mounting of the tire 13 on the wheel rim 12 is desired. Both the tire and the wheel rim radial runout measurements have been obtained as described hereinbefore and the runout data acquired by the controller 53. The controller calculates a least squares best fit between the radial runout curves for a full revolution of the wheel rim 12 and the tire 13. The least squares best fit calculation for the radial runout curves of the wheel rim and the tire minimizes force peaks or major differences between the two curves. This reset follows because force is proportional to the tire spring rate and the displacement, wherein the spring rate is primarily the spring rate of the sidewall of the tire and the displacement is that measured by the displacement transducer 31 at points on the periphery of the tire. The least squares best fit method of matching the wheel rim and tire radial runout curves is superior to the method of matching the areas under the curves, because visual reduction of the area existing between the curves by changing the relative phase relationship of the curves does not focus on reduction of the amplitude of displacement remaining between the curves, which in turn is proportional to the force caused by radial runout. Minimizing displacement, as set forth in the invention described herein, is equivalent to minimizing force which is equivalent to optimal minimization of operating vibration characteristics in a wheel rim and tire assembly. The method of least squares best fitting between two curves is described in Schaum's Outline of Theory and Problems of Probability and Statistics, Murray R. Spiegel, PhD., McGraw Hill Book Company, pages 259-261, and Mechanical Design & Systems Handbook, Harold A. Rothbart, McGraw Hill Book Company, page 1-84.

The following is a description of one practical approach to obtaining the least squares best fit between rim runout and wheel rim and tire assembly runout curves. The left and right wheel rim profiles are measured. The average of the left and right wheel rim profiles is calculated. The tire profile is measured while mounted on the wheel rim while the wheel assembly is loaded with the load wheel 24. For each of the tire and wheel rim profiles the average runout value is calculated and that average is assigned a value of 0. This results in a curve for each of the wheel rim and the mounted rim and tire assembly which have approximately equal positive and negative curve areas. Each of the rim radial runout and rim/tire assembly radial runout curves is assigned the same number of spaced data points, for example 16. Rim data point No. 1 is matched with tire data point number 1, the two data point values are subtracted, and the difference is squared. This process is repeated for each of data points 2 through 16 for the rim and the rim/tire assembly. The squares of the differences of all data points is summed for this first set of matching points. Rim data point No. 1 is matched with data point No. 2 (effectively shifting the tire/rim assembly data points one data position to the left with respect to the rim data points. The difference is computed between tire data point No. 2 and rim data point No. 1, squared and the process repeated for this second set of data points matching rim data point No. 2 with tire data point No. 3; rim data point No. 3 with tire data point No. 4; etc. The squares of the differences of all the data points for this second set of matching points is summed. The foregoing process is repeated for a third set of data points initially matching rim data point No. 1 with tire data point No. 3, and so on. The differences for all sixteen data point sets is computed, squared and summed to obtain a third set of squares of the differences of the data points. The foregoing process is repeated for all combinations of rim and rim/tire data points, sixteen in this example. One of the sets of the sum of the squares will be a minimum. The minimum sum will identify the matching angular relationship between the wheel rim and the tire to provide the smallest force peak (which is proportional to the smallest displacement peak) for the wheel rim and tire assembly. For example, if the smallest sum of the squares is obtained when the rim data point No. 1 is matched with the tire data point No. 7, the tire angular position identified by data point No. 7 should be aligned with the rim angular position identified by rim data point No. 1. This is a simplified description for this special case of the least squares best fit method described in the cited textual references herein.

It should be noted that the measurement of radial runout is conveniently done at about 60 rpm at the roller 24. This relatively low speed is for the purpose of keeping the roller 24 from "settling" into the tire and thereby changing the radial runout reading in error. Alternatively, the roller may be run at a speed which drives the wheel rim and tire assembly at a vehicle operating speed and load to obtain tire and rim assembly radial runout under simulated operating conditions.

With reference again to FIG. 5 of the drawings, the least squares best fit calculation between the radial runout of the tire and the wheel rim having been calculated, the process involves marking the tire at the point on the tire which should be rotated to coincide with the valve position on the wheel rim. The balancer 11 is placed in a standby mode while the tire is deflated, the beads are broken, the tire is moved to align the mark with the rim valve, and the tire is again inflated. The balancer is instructed to come out of the standby condition and the wheel assembly parameters automatically entered into the system controller 53 by the vision system 16 (or alternate means) is checked. Once again the load roller 24 is urged into contact with the periphery of the adjusted wheel rim and tire assembly and loaded radial runout is again measured. If the assembly radial runout is now acceptable, the process proceeds to E (FIG. 4), measurement of assembly unbalance and correction through the addition of unbalance compensation mass. However, if the assembly is not yet within acceptable limits, the process queries whether the loaded radial runout is as predicted. In the event the runout is not as predicted, it is concluded that the match mount was improper and appropriate instructions are provided by controller 53 for the operator. On the other hand, if the run out is as predicted, the process inquires whether match grinding is desired. A negative answer causes the process to proceed to unbalance measurement and compensation as hereinbefore described for entry point E. If match grinding is desired the process proceeds to A in FIG. 6.

Figure 6:
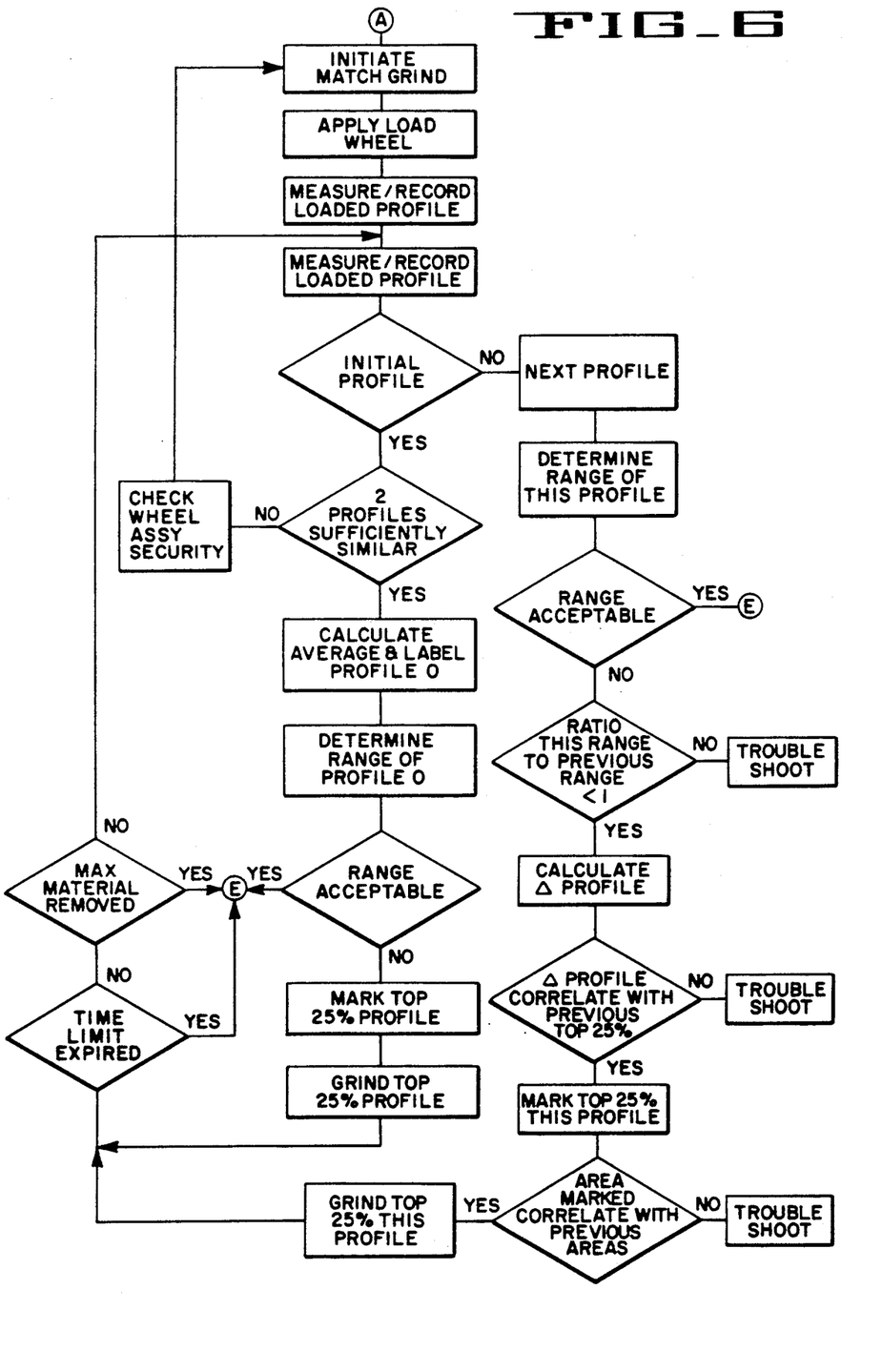
FIG. 6 is an additional flow chart showing a method performed by the apparatus of the present invention.
Figure 9:
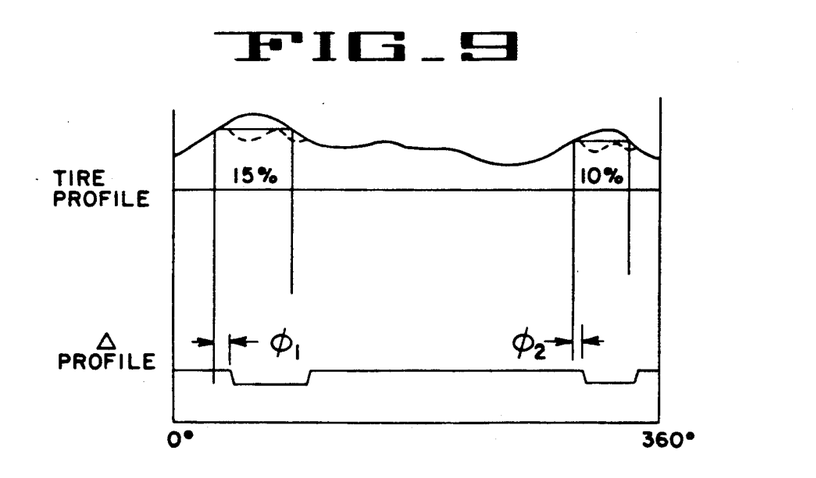
FIG. 9 is a graph showing a 360° profile for a tire mounted on a wheel rim and a delta profile of the tire following a tire grinding operation.

Match grinding is initiated as shown in FIG. 6 and the load wheel 24 is applied to the periphery of the wheel rim and tire assembly as described hereinbefore in conjunction with FIG. 3. Two entire wheel assembly profiles are measured and recorded and query is made as to whether this is the initial assembly profile measurement. If this is the first profile measurement in the match grinding portion of the process, query is then made as to whether or not the two profiles are similar within predetermined tolerances. As described hereinbefore in conjunction with FIG. 4, if the profiles are dissimilar to an unacceptable degree, the wheel assembly mounting on shaft 14 is checked, corrected if necessary and the match grinding process reinitiated as shown in FIG. 6. Alternatively, if the two profiles are similar within the predetermined tolerances for similarity, which may be approximately 0.01 inches, the average of the two profiles is calculated and labeled Profile No. 0. Thereafter the range of Profile 0 is determined, which is the differential between the high and the low points on the average curve representing Profile 0. Acceptable ranges may lie within 0.01 to 0.015 inches. If the range is acceptable the process proceeds to measurement of unbalance and correction thereof as seen at E in FIG. 4. If the range is not acceptable, the top approximate 25 percent of the profile is marked as seen for example in FIG. 9. The two peaks in the profile curve, one extending 15 percent of the entire periphery and the other extending 10 percent of the entire periphery, are identified by the controller 53 and the controller causes the grinding wheels 44 to contact the periphery of the tire, while it is being rotated, at the identified 15 percent and 10 percent portions (total 25 percent) of the tire periphery. The process is then queried as to whether the time limit assigned for grinding has expired. If the answer is "yes", the process proceeds to E in FIG. 4 as hereinbefore described. If the time limit has not expired, the process is queried as to whether the maximum allowable amount (predetermined) of tire material has been removed. If the maximum amount of material has been removed, the process proceeds to E, FIG. 4. If not, the process returns to measure and record the loaded tire profile for another revolution. In this event, this is not the initial profile measurement in the match grinding procedure and the profile number is labeled with the next profile number, in this instance Profile No. 1. The range of Profile No. 1 is determined as described before and the process then involves a query as to whether the current range is acceptable. In the event the range is acceptable, the process proceeds to E, FIG. 4. If the range is not acceptable, the ratio of this range is compared to the previous range. If that range is not less than 1 (if the grinding of Profile No. 0 has not provided some improvement), the operator is required to trouble shoot the process, because the result is unexpected. If the ratio of the range of Profile 1 verses Profile 0 is less than 1, the delta profile is calculated. The delta profile is shown in FIG. 9 below the ground profile described hereinbefore. The delta profile is calculated by controller 53 by looking at the change in Profile 1 as compared to Profile 0 and noting the angular difference or phase shifts, $\phi_1$ and $\phi_2$ as shown in FIG. 9. $\phi_1$ and $\phi_2$ represent angular differences between the intended ground portions of Profile 0 and the actual ground portions as measured in Profile No. 1. Controller 53 has contained therein data representing an acceptable phase shift or delta profile. If the delta profile correlates with the previous top 25 percent marked for grinding in Profile 0 within the predetermined limits for $\phi_1$ and $\phi_2$, the top 25 percent of Profile 1 is marked or recorded for grinding by controller 53. If the delta profile is outside the predetermined limits for correlation with the 25 percent marked for grinding in Profile 0, the system requires trouble shooting for unexpected results. If the area marked in Profile No. 1 correlates with the previous areas marked in Profile 0 then the top 25 percent of Profile 1 is ground If it does not, then clearly the grinding of Profile 0 has created new low points in the profile, the results are unexpected and the operator is instructed to trouble shoot the process. As with the grinding of Profile 0 following the grinding of Profile No. 1, the query is made with regard to expiration of the maximum time limit for grinding and maximum material removal. A "yes" to either inquiry will result in the process proceeding to E, FIG. 4 for unbalance measurement and correction. Alternatively, negative answers to these two queries will place the match grinding portion of the process back into the loaded profile measurement of FIG. 6. The process of match grinding is repeated until the range is found acceptable, the time limit for match grinding has expired, or maximum tire material has been removed.

Figure 7:
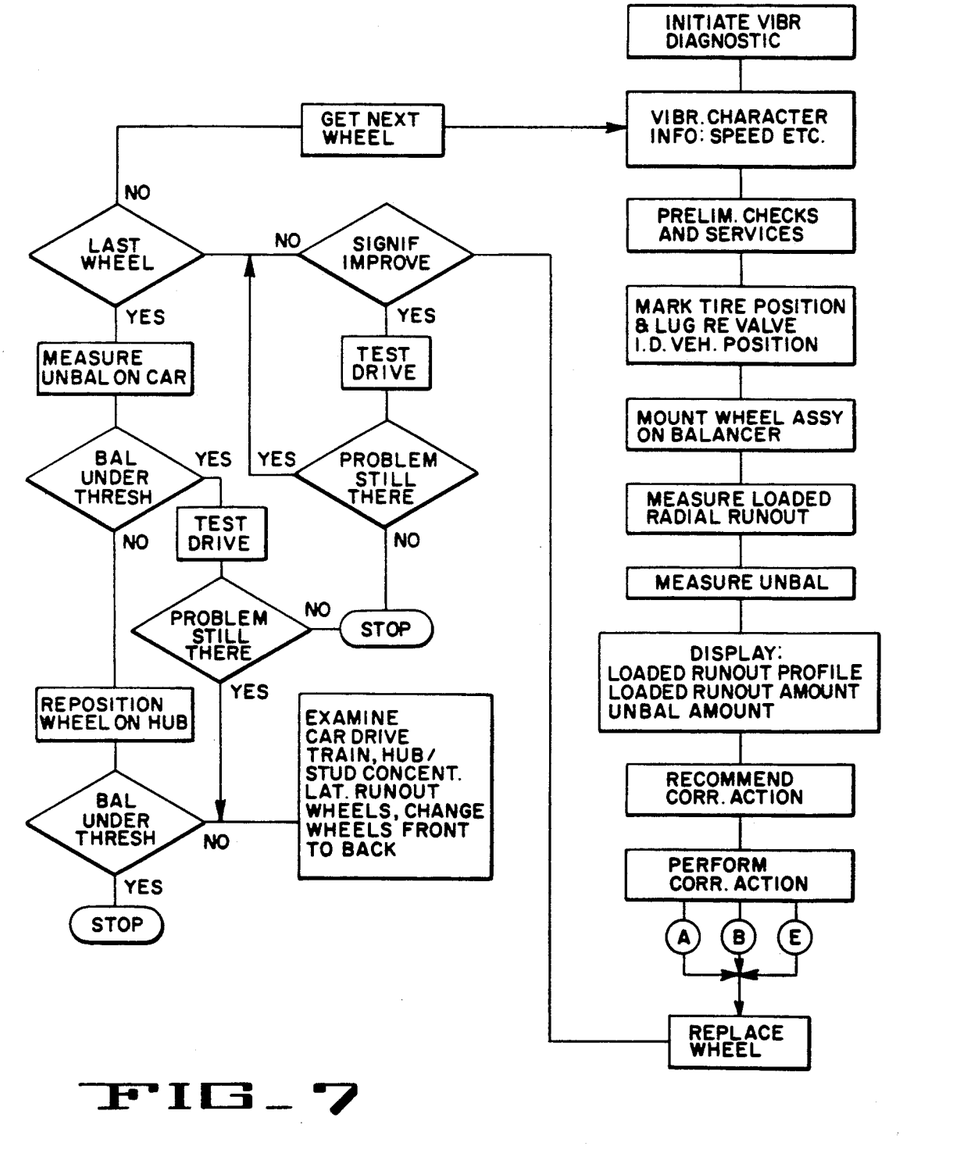
FIG. 7 is a flow chart showing a method performed by the apparatus of the present invention.

With reference now to FIG. 7 of the drawings, the routine for vibration diagnostics will be described. First, the vibration character, for example, speed of travel where vibration occurs or any suspected parts of the suspension where the vibration is occurring, are entered. Preliminary checks and service are made for each of the vehicle wheel assemblies. The present tire position is marked on the rim and the present wheel lug position relative to the rim valve is marked. The wheel assembly vehicle position (left front, etc.) is identified. The wheel assembly is then mounted on the balancer 11. The loaded radial runout of the wheel assembly is then measured as described hereinbefore in conjunction with FIG. 4. The wheel assembly unbalance is then measured. The wheel assembly loaded runout profile and loaded runout amount together with the unbalance amount is displayed. Recommended correction action is obtained from the system by means of a display or printout and the recommended corrective action, wheel assembly unbalance correction, wheel assembly match mounting, and/or wheel assembly match grinding is performed. The wheel is then replaced on the vehicle. If there has been significant improvement in that wheel assembly, the vehicle is test driven. If the problem is gone, the process is stopped. If there is no significant improvement by virtue of the operation on the first wheel assembly, or if the problem still exists, query is made as to whether this is the last wheel on the vehicle to be analyzed. If it is not the last wheel, the next wheel is obtained and the aforementioned vibration diagnostic steps through a determination of whether or not significant improvement has been obtained by the operations on this wheel assembly is performed. As before, if significant improvement in the wheel assembly has occurred the vehicle is test driven and if the problem has disappeared the process is stopped. Again, if no significant improvement occurs or the problem still exists, the next wheel is obtained from the vehicle and the diagnostic process is repeated unless this is the last wheel on the vehicle. When the last vehicle wheel has been subjected to the diagnostic process described herein in conjunction with FIG. 7. the unbalance of the wheels is measured on the car. If the balance is beneath an acceptable threshold. the process is stopped. If the unbalance of the wheels is above the acceptable threshold. the wheels may need to be repositioned on the wheel hub. If now the balance is beneath the acceptable threshold, the process is stopped. If the balance still is not beneath the acceptable threshold, the vehicle drive train, hub or stud concentricities. and wheel lateral runout are investigated. Additionally, the vehicle wheels may be transferred from one end of the vehicle to the other in a final attempt to obtain acceptable operational vibrational characteristics in the vehicle.

Figure 8:
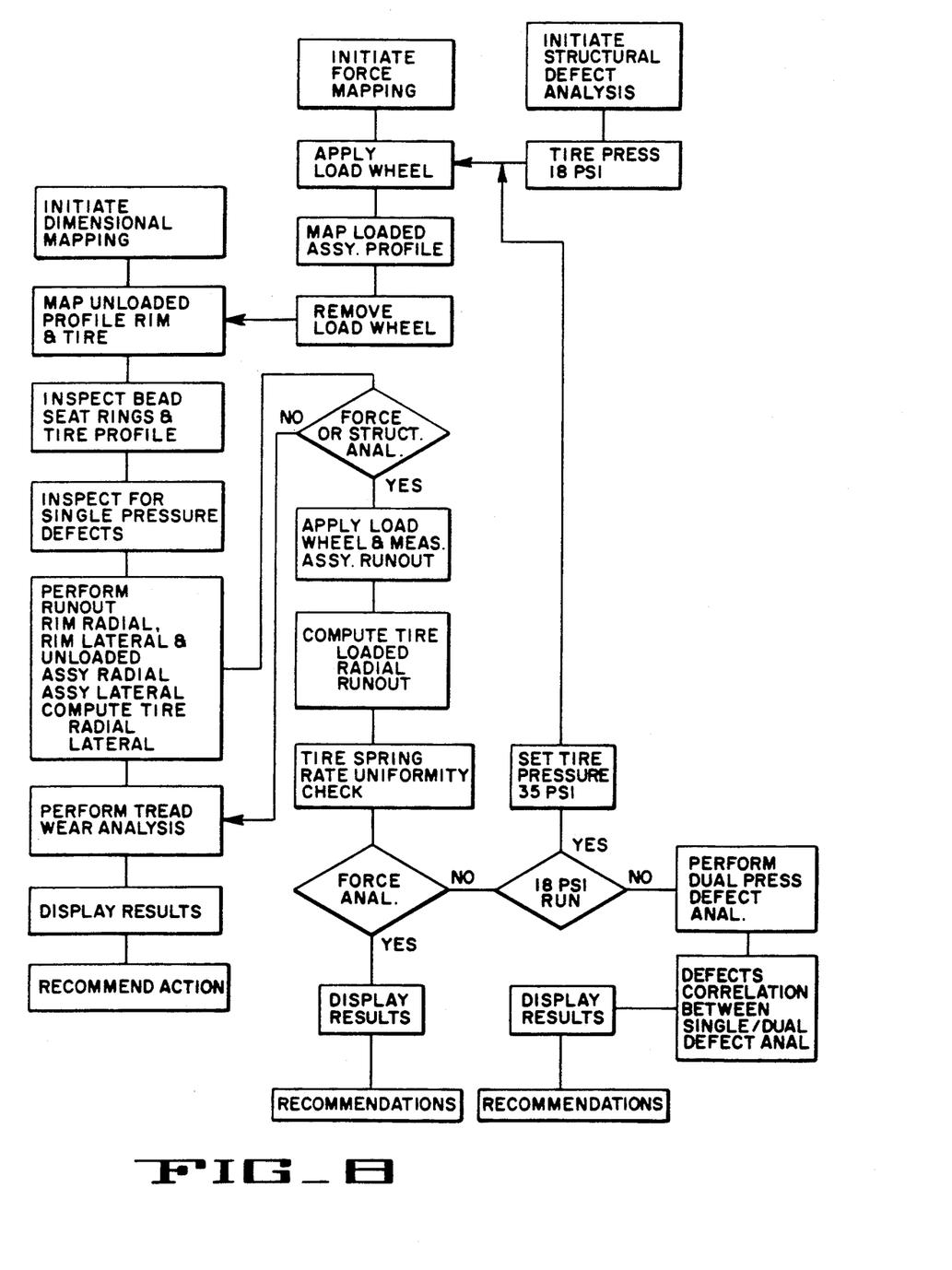
FIG. 8 is a flow chart showing some of the operating capabilities of the apparatus of the present invention.

Turning to FIG. 8 of the drawings, certain tire and wheel fault diagnoses are described. Dimensional mapping of the tire and wheel assembly is initiated which involves inspecting the tire from the bead seat to the tread while the wheel assembly is being rotated through all encoder positions of the shaft 14. The tire profile measurements are used to provide data through which inspection of the tire beads as they are seated on the wheel rim is obtained. Inspection is then made for "single pressure defects" by searching for known problem types. These inspections or searches may be done with the vision system 16. Wheel rim radial and lateral runout is measured and unloaded wheel rim and tire assembly radial and lateral runout is measured. As described hereinbefore, tire radial and lateral runout is computed from the rim and assembly runout measurements. Tread wear analysis at the periphery of the tire 13 is performed using the vision system 16. The results of the dimensional mapping are displayed and action is recommended.

The force mapping diagnosis is initiated by applying the load wheel to the periphery of the tire 13 with a predetermined force as hereinbefore described. The loaded wheel rim and tire assembly profile is recorded and the load wheel is removed. The unloaded profile of the wheel rim and tire assembly is also recorded and an inspection of the bead seat indicator rings and sidewall profiles is undertaken. A "single pressure defect analysis" is performed by searching for surface shapes that are characteristic of known problem types. Rim radial and lateral runout is measured and unloaded wheel rim and tire assembly radial and lateral runout is measured. Tire radial and lateral runout is computed as described hereinbefore. The load wheel 24 is applied to the periphery of the tire 13 and the wheel rim and tire assembly runout is measured. Tire loaded radial runout is computed. A tire sidewall spring rate uniformity check is made. This entails determining the amount of difference in the tire sidewall spring rate at a given pressure through an entire revolution of the wheel rim and tire assembly. Results are displayed and recommendations for action to be undertaken by the operator are thereafter made on a display or printout.

Continuing with reference to FIG. 8 of the drawings, the structural defect fault diagnosis is undertaken. Tire pressure is set at 18 psi. The load wheel 24 is applied to the periphery of the tire as hereinbefore described. The loaded assembly profile is measured. The load wheel 24 is removed from the periphery of the tire. The unloaded profile of the tire from the bead seat to the tread is inspected for all positions of the encoder on shaft 14. The tire bead seat indicator rings are inspected together with sidewall profile shaped variations at the wheel rim. A "single pressure defect analysis" is performed by searching the tire for surface shapes that are characteristic of known problem types. Rim radial and lateral runout is measured. Unloaded wheel rim and tire assembly radial and lateral runout is performed and tire radial and lateral runout is computed as described hereinbefore. The load wheel 24 is applied to the periphery of the tire 13 and wheel rim and tire assembly runout is measured. Tire loaded radial runout is computed. A tire sidewall spring rate uniformity check is undertaken. The tire pressure is increased to 35 psi and the foregoing portion of the process for structural defect and analysis is repeated. Thereafter a "dual pressure defect analysis" is performed by calculating the change in the unloaded profiles between the 18 and 35 psi inspections. Weak spots in the tire 13 will exhibit more change. A check for correlation between the single and the dual defect analysis is undertaken. The results of the structural defect analysis are displayed and the operator is given recommendations for action if any is required.

Although the best mode contemplated for carrying out the present invention has been herein shown and described, it will be apparent that modification and variation may be made without departing from what is regarded to be the subject matter of the invention.

What is claimed is:

1. A method of adjusting a rim and tire assembled in a first positional relationship so that the assembled rim and tire is within acceptable radial runout and unbalance limits comprising the steps of
    measuring the radial runout of the rim and tire in the first positional relationship for at least one revolution,
    comparing the measured rim and tire radial runout with the acceptable runout limits,
    measuring the rim radial runout for at least one revolution when the measured rim and tire radial runout limit is exceeded in the first positional relationship,
    calculating a least squares best fit second rim and tire positional relationship using the rim and tire and the rim radial runout measurements, and
    adjusting the tire on the rim rotationally to the second positional relationship when sufficient radial runout improvement is predicted.

2. A method as in claim 1 wherein the acceptable rim and tire radial runout limits are acceptable loaded radial runout limits and wherein the step of measuring the radial runout of the rim and tire comprises the step of measuring the loaded radial runout of the rim and tire assembled in both the first and second positional relationships.

3. A method as in claim 2 wherein the steps of measuring the loaded radial runout of the rim and tire comprise the steps of measuring radial runout profile for at least two revolutions and calculating the average profile for use in the step of calculating.

4. A method as in claim 1 wherein the steps of measuring the radial runout of the rim and tire comprise the steps of measuring radial runout profile for at least two revolutions and calculating the average profile for use in the step of calculating.

5. A method as in claim 1 wherein the step of measuring the rim radial runout comprises the steps of measuring the inner bead seat radial runout, measuring the outer bead seat radial runout, and calculating the average bead seat radial runout for use in the step of calculating.

6. A method as in claim 1 comprising the step of performing a vibration analysis of the rim and tire.

7. A method as in claim 1 comprising the step of performing a rim and tire structural defect analysis.

8. A method as in claim 1 comprising the step of performing a rim and tire force mapping analysis.

9. A method as in claim 1 comprising the step of performing a rim and tire dimensional mapping analysis.

10. A method as in claim 1 comprising the steps of
measuring the radial runout of the rim and tire in the second positional relationship for at least one revolution,
match grinding the tire when sufficient improvement in radial runout is predicted,
measuring the unbalance of the rim and tire, and
applying mass to the rim to correct unbalance when the unbalance limit is exceeded.

11. A method as in claim 10 wherein the step of match grinding comprises the steps of
measuring a first loaded rim and tire radial runout profile,
determining if the first loaded rim and tire radial runout profile is within the acceptable limits,
identifying the high portion of the first runout profile,
grinding the high portion of the first runout profile if the first runout profile is not within the acceptable limits,
measuring the ground runout profile,
determining if the ground runout profile is within the acceptable limits,
determining if the ground runout profile is an improvement over the first runout profile if the ground runout profile is not within the acceptable limits,
calculating the profile change if the ground runout profile is an improvement,
comparing the profile change with the identified high portion of the first runout profile,
identifying the high portion of the ground runout profile if the profile change correlates with the high portion of the first runout profile, and
grinding the identified high portion of the ground runout profile.

12. A method as in claim 10 wherein the step of match grinding comprises the step of terminating grinding upon removal of a predetermined maximum amount of tire material.

13. A method as in claim 10 wherein the step of match grinding comprises the step of terminating grinding upon expiration of a predetermined maximum length of time in the match grinding step.

14. A method of diagnosing and adjusting a rim and tire assembled in a first positional relationship so that the assembled rim and tire is brought within acceptable operating limits comprising the steps of
detecting the unloaded tire profile for the entire profile,
inspecting the detected profile of the tire for proper bead seating and for surface defects,
measuring the unloaded runout of the rim and tire in the first positional relationship,
computing the runout of the tire from the unloaded runout measurement of the rim and tire in the first positional relationship,
performing a tread wear analysis from the unloaded runout measurement, and
matching the rim and tire in a second positional relationship, match grinding the tire as required by the foregoing dimensional mapping steps and applying mass to correct rim and tire unbalance to bring the rim and tire within the acceptable limits.

15. A method of diagnosing and adjusting a rim and tire assembled in a first positional relationship so that the assembled rim and tire is brought within acceptable operating limits comprising the steps of
measuring the loaded radial runout profile of the rim and tire in the first positional relationship for the entire profile,
detecting the unloaded tire surface profile for the entire profile,
inspecting the detected profile for proper bead seating and for surface defects,
measuring the unloaded runout of the rim and tire in the first positional relationship,
computing the runout of the tire from the unloaded runout measurement of the rim and tire assembly in the first positional relationship,
and
matching the rim and tire in a second positional relationship, match grinding the tire as indicated by the results of the foregoing steps and applying mass to correct rim and tire unbalance to bring the rim and tire within acceptable operating limits.

16. A method as in claim 15 comprising the steps of initially inflating the tire to a first pressure level,
thereafter inflating the tire to a second pressure level, and
repeating the steps of claim 14, wherein the step of inspecting the detected surface profile comprises the steps of inspecting at the first and second pressure levels, and
correlating the profiles to detect weak tire areas based on profile change between the first and second pressure levels.

17. Apparatus for diagnosing and adjusting a tire and wheel rim for optimal relative mounting position, comprising
means for supporting the wheel rim for driven rotation thereon,
means for detecting the position, configuration and radial runout of the wheel rim and the tire mounted thereon,
means for loading the periphery of the mounted tire with a constant force,
means for sensing the displacement of said means for loading, and
means for comparing coupled to said means for detecting and means for sensing operating to compare measured radial runout of the wheel rim with the radial runout of the tire mounted in an initial position on the wheel rim and for calculating a least squares best fit between the tire and the wheel rim radial runouts representing an optimal position of the tire on the wheel rim.

18. Apparatus as in claim 17 comprising means for grinding the tire, said means for comparing comprising means for controlling said means for grinding to remove material from the tire at calculated positions on the tire periphery when material removal will improve tire and wheel rim operating characteristics.

19. Apparatus for diagnosing and adjusting a tire and wheel rim for optimal relative mounting position, comprising
means for supporting the wheel rim for driven rotation thereon, means for detecting the position, configuration and radial runout of the wheel rim and the tire mounted thereon, means for loading the periphery of the mounted tire with a constant force, means for sensing the displacement of said means for loading, and means for comparing coupled to said means for detecting and means for sensing operating to compare measured radial runout of the wheel rim with the radial runout of the tire mounted in an initial position on the wheel rim and for calculating a least squares best fit between the tire and the wheel rim radial runouts representing an optimal position of the tire on the wheel rim.

20. Apparatus as in claim 18 wherein said means for controlling comprises means for limiting the time the material may be ground from the tire.

21. Apparatus as in claim 18 wherein said means for loading comprises
means for metering said constant force to assume a level representative of an operating load on the mounted tire.

22. Apparatus as in claim 17 wherein said means for detecting comprises a vision system.

23. Apparatus as in claim 17 wherein said means for detecting comprises contact probe means.

24. Apparatus as in claim 17 wherein said means for loading comprises means for driving the wheel rim rotationally.

25. Apparatus as in claim 17 wherein said means for supporting comprises means for driving the wheel rim rotationally and means for measuring unbalance in the wheel rim and the tire and wheel rim assembly.

26. Apparatus for diagnosing and correcting vibration causing characteristics in a wheel rim and tire assembly comprising
means for measuring unbalance in the wheel rim and tire assembly and for indicating angular position and magnitude of mass change for correcting the unbalance,
means for measuring radial runout of the wheel rim,
means for measuring radial runout of the tire mounted on the wheel rim, and
means for calculating the least squares best fit between the tire and the wheel rim radial runouts and for indicating the relative angular position of the wheel rim and tire at which the least squares best fit occurs.

27. Apparatus as in claim 26 wherein said means for calculating comprises means for asserting whether sufficient benefit in vibration characteristics will be achieved if the tire is moved on the wheel rim to the indicated angular position.

28. Apparatus as in claim 26 wherein said means for measuring radial runout comprises a vision system.

29. Apparatus as in claim 26 wherein said means for measuring radial runout of the tire comprises a load roller for contact with the tire periphery and means for applying said load roller to the tire with a substantially constant force.

30. Apparatus as in claim 29 comprising means for sensing displacement of said load roller.

31. Apparatus as in claim 26 comprising tire grinder means coupled to said means for calculating, said last named means comprising means for controlling said tire grinder means to remove material from the tire if sufficient benefit in vibration characteristics will be achieved thereby.

32. Apparatus as in claim 31 wherein said means for controlling comprises means for inhibiting tire material removal after a predetermined volume of material is removed.

33. Apparatus as in claim 31 wherein said means for controlling comprises means for inhibiting tire material removal after a predetermined length of grinding time has elapsed.

34. Apparatus as in claim 31 wherein said means for controlling comprises means for inhibiting tire material removal subsequent to an initial removal if the peripheral locations of the subsequent removal do not substantially correspond to the peripheral locations of the initial removal.

35. A method of reducing operational vibration characteristics to be within specifications in a wheel rim and tire assembly having the tire mounted in an initial position, comprising the steps of
measuring the loaded runout of the assembly with a constant force applied against the periphery of the tire,
measuring the runout of the wheel rim,
determining if the runout of either the rim or the tire is excessive,
comparing the runout of the tire and the wheel rim if neither tire or rim runout is excessive to determine if match-mounting the tire on the wheel rim to a subsequent position would produce vibration improvement,
match-mounting the tire on the wheel rim to the subsequent position if vibration improvement would be produced,
checking for match-grinding vibration improvement if the loaded runout of the assembly is not within specifications,
match-grinding the tire if the assembly is not within specification and vibration improvement would be produced,
measuring the wheel rim and tire assembly unbalance on a wheel balancing machine, and
correcting the assembly unbalance if it is not within specifications.

36. A method of reducing operational vibration characteristics to be within specifications in a wheel rim and tire assembly having the tire mounted in an initial position, comprising the steps of
measuring the loaded runout of the assembly with a constant force applied against the periphery of the tire,
measuring the runout of the wheel rim,
determining if the runout of either the rim or the tire is excessive,
comparing the runout of the tire and the wheel rim if neither tire or rim runout is excessive to determine if match-mounting the tire on the wheel rim to a subsequent position would produce vibration improvement,
match-mounting the tire on the wheel rim to the subsequent position if vibration improvement would be produced,
checking for match-grinding vibration improvement if the loaded runout of the assembly is not within specifications,
match-grinding the tire if the assembly is not within specification and vibration improvement would be produced, measuring the wheel rim and tire assembly unbalance on a wheel balancing machine, and correcting the assembly unbalance if it is not within specifications.

37. The method of claim 35 comprising the step of prohibiting further match-grinding after a predetermine maximum amount of tire material volume has been removed.

38. The method of claim 35 comprising the step of prohibiting further match-grinding after a predetermine maximum amount of tire grinding time.

39. The method of claim 35 comprising the step of adjusting the constant force to a level representative of a vehicle operating level.

40. The method of claim 35 wherein the step of measuring the runout of the wheel rim comprises the steps of measuring the runout of the rim at each of the inner and outer bead seats, and averaging the inner and outer bead seat runouts.

* * * * *